United States Patent [19]

Fisch et al.

[11] Patent Number: 5,404,814
[45] Date of Patent: Apr. 11, 1995

[54] CONNECTING DEVICE FOR THE DOME OF A MISSILE

[75] Inventors: Peter Fisch, Überlingen; Hans Kordulla, Owingen, both of Germany

[73] Assignee: Bodenseewerk Geratetechnik GmbH, Überlingen, Germany

[21] Appl. No.: 136,205

[22] Filed: Oct. 15, 1993

[30] Foreign Application Priority Data

Oct. 20, 1992 [DE] Germany .................. 42 35 266.5

[51] Int. Cl.6 .................. B64C 1/26; B64C 1/14
[52] U.S. Cl. .................. 102/293; 244/3.16
[58] Field of Search ................ 102/293, 213; 244/3.16

[56] References Cited

U.S. PATENT DOCUMENTS

| | | | |
|---|---|---|---|
| 3,165,749 | 1/1965 | Cushner | 244/3.16 |
| 4,010,365 | 3/1977 | Meyer et al. | 244/3.16 |
| 4,030,807 | 6/1977 | Briney | 244/3.16 |
| 4,413,177 | 11/1983 | Godwin et al. | 244/3.16 |
| 4,619,421 | 10/1986 | Trummer | 244/3.16 |
| 5,262,630 | 11/1993 | Kordulla | 244/3.16 |

FOREIGN PATENT DOCUMENTS

| | | |
|---|---|---|
| 0079684 | 5/1983 | European Pat. Off. . |
| 2222952 | 11/1973 | Germany . |
| 3342958 | 6/1985 | Germany . |
| 4124011 | 10/1992 | Germany . |
| 2107127 | 4/1983 | United Kingdom . |

*Primary Examiner*—David Brown
*Attorney, Agent, or Firm*—Keck, Mahin & Cate

[57] ABSTRACT

A connecting assembly serves for connecting a dome covering a seeker head with the structure of a missile. A holding ring extends over the rim of said dome, positively holding this dome and connected with the structure of the missile. An annular recess is provided underneath the holding ring along the rim of the dome. This recess contains a flexible sealing substance for establishing a seal between the holding ring and the dome. It is important, that no additional material bonding such as cementing or soldering is provided between the dome and the holding ring.

10 Claims, 3 Drawing Sheets

CONNECTING DEVICE FOR THE DOME OF A MISSILE

The invention relates to a connecting assembly for connecting a dome covering a seeker head with the structure of a missile.

Target tracking missiles contain seeker heads in their tips. The seeker head detects a target and provides steering signals which guide the missile to the target. The seeker head is covered by a "dome". The dome is a cup-shaped hood, which is connected with the structure of the missile and forms the tip of the missile. This dome has to be transparent for the wavelengths at which the seeker head operates. In many cases, the seeker heads operate in the infrared wavelength range. It presents problems to connect such a dome with the structure of the missile. The electromagnetically transparent material of the dome is very brittle and sensitive to mechanical stress. The dome has to be connected sealingly with the structure or airframe of the missile to ensure that the highly delicate seeker head cannot be damaged by environmental influences. The connection between dome and structure must be able to endure heavy temperature variations. High temperatures occur during the flight phase of the missile. Sometimes, the specifications require that such missiles remain operative over decades without servicing like ordinary ammunition.

Various attempts have been made to connect the dome with the structure of the missile by soldering methods. Such soldering methods, however, cause mechanical stress in the dome. They require expensive special manufacturing procedures. Mechanical stress is also caused by different dilations of the parts. It has been tried to solve these problems by the use of very expensive materials, for example by niobium (columbium) or tantal materials. It has also been tried to cement the parts to each other. Great demands are made, however, on such cemented connections. Conventional cements are not suitable for high-velocity missiles, in which high temperatures are generated. It is also not possible to ensure that such cemented connections remain unchanged over long periods of time.

It is an object of the invention to provide a simple and reliable connecting assembly for connecting a dome with the structure of a missile.

According to the invention a holding ring extends over the rim of said dome, positively holding said dome and connected with the structure of said missile. An annular recess is provided underneath the holding ring along the rim of the dome. This recess contains a flexible sealing substance for establishing a seal between the holding ring and the dome. It is important, that no additional material bonding such as cementing or soldering is provided between the dome and the holding ring.

Thus, according to the invention, the dome is not connected to the structure by "material bonding" but is only retained positively by form-fit of the holding ring and the dome. The sealing function is separated from the holding function. The sealing function is fulfilled by a sealing material, which is provided in a groove or recess along the rim of the dome underneath the holding ring. Surprisingly, it has been found that such a simple assembly without material bonding connection between dome and holding ring, i.e. without soldering or cementing, is able to meet the specifications.

The dome is incorporated in the structure with low stress. The holding ring can be made of a material which, with respect to its dilation within the relevant temperature range, is matched with the material used for the dome. The dome can deform within its mounting. Thereby the service life of the dome is substantially prolonged. The dome is mounted in a high-temperature resistant way. This is achieved without expensive and stress-inducing soldering or cementing methods. Inexpensive materials can be used for the mounting. The dome can easily be removed for the servicing of the seeker head. The volume available for the connecting assembly in the region of the seeker head is limited. The assembly of the invention requires minimal volume.

In a preferred embodiment, the structure has a reduced rim portion. The rim of the dome engages an end face of this reduced rim portion. The annular recess is defined between the reduced rim portion of the missile structure and the rim of the dome. The structure, at its dome-end, has a slightly tapering section. In one embodiment this slightly tapering section is slightly conical. In another embodiment the slightly tapering section is spherical. The sealing substance is of a nature to permit injection thereof into the annular recess. The dome has an end face engaging the end face of the reduced rim portion. The annular recess is defined by the rim portion and the end face of the dome. A shallow-stepped section communicates with the tapering section. The reduced rim portion, in turn, communicates with this shallow-stepped section and has an outer surface reduced with respect to an outer surface of the shallow-stepped section. The holding ring engages said outer surface of the shallow-stepped section, is connected thereto and extends over the rim portion and the rim of the dome. The holding ring is connected with the structure by spot welding. The structure of the missile has a sheet metal shell at its front end. This sheet metal shell has a cylindrical rear rim connected with a structure part and has a spherical section at its seeker-side front rim. The reduced rim portion communicates with this spherical section.

Two embodiments of the invention will now be described in greater detail with reference to the accompanying drawings.

Figure 1:
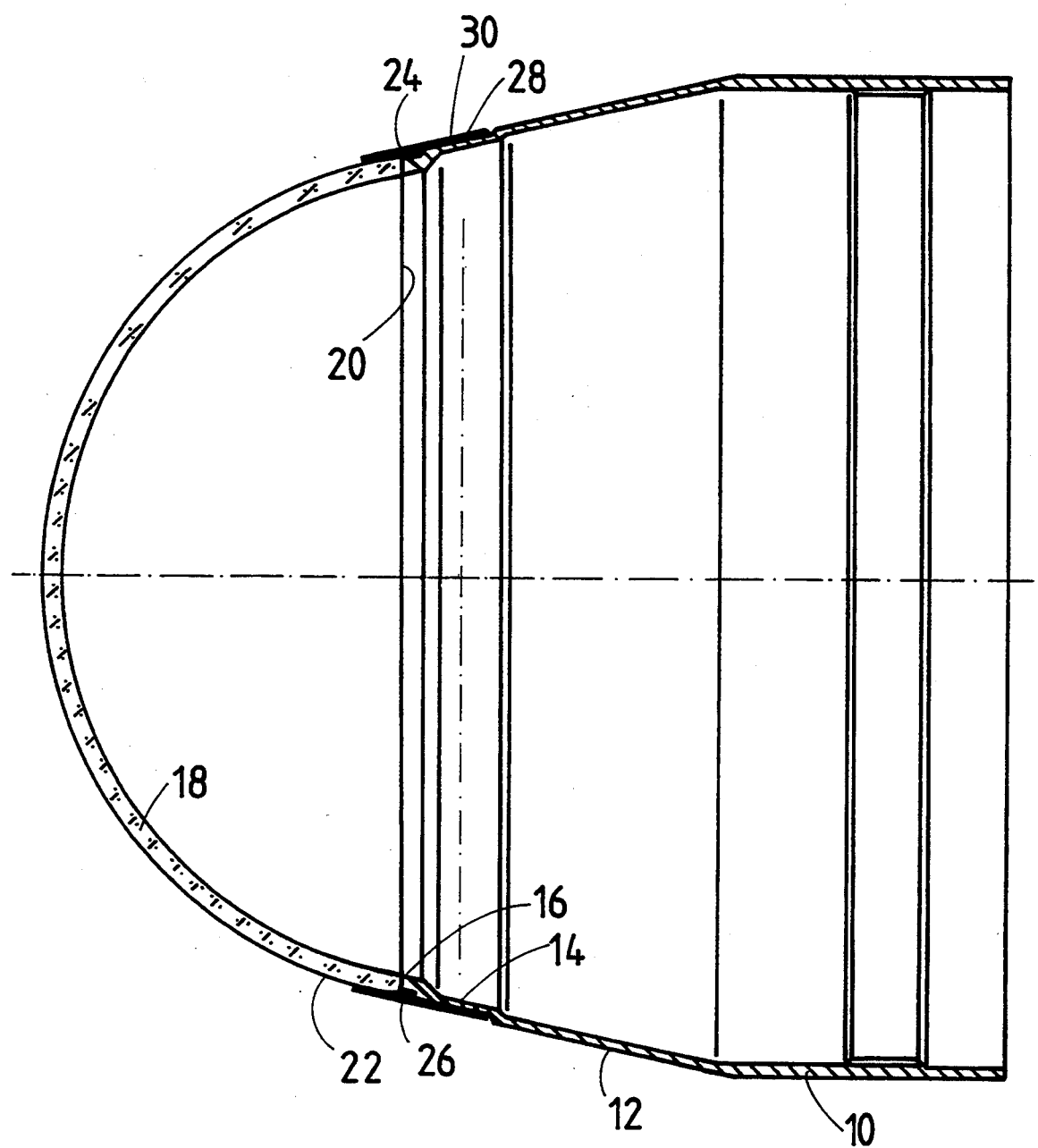
FIG. 1 is a longitudinal sectional view of the dome and of the adjacent structure of the missile.
Figure 2:
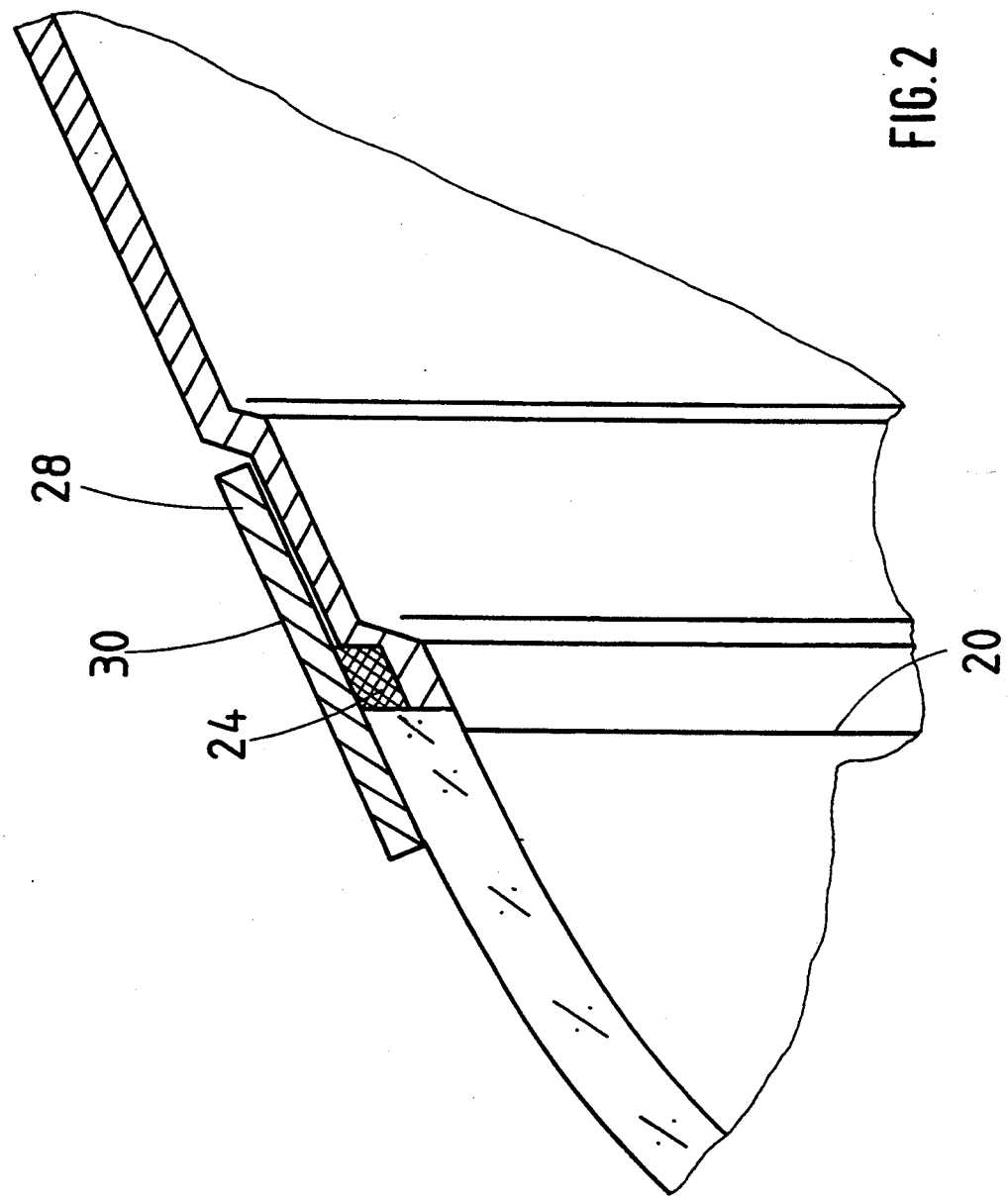
FIG. 2 shows a detail of FIG. 1 at an enlarged scale.

Referring to FIG. 1, numeral 10 designates the structure or airframe of a missile. The structure 10 is of generally tubular shape. A sightly conical section 12 is provided at the front end of the structure. The conical section 12 communicates with a shallow-stepped, reduced section 14. An again stepped, reduced and, at the same time, thickened rim portion 16 communicates with section 14.

Numeral 18 designates a dome, which consists of a brittle, infrared-transparent material, for example sapphire, magnesium fluoride, zinc sulphide, silicon or appropriate glass. The dome 18 is a substantially hemispherical hollow body. The dome 18 has a planar end face 20 at its edge. The end face 20 is located in front of the also planar end face of the edge portion 16. The edge portion 16 is orthogonal to the longitudinal axis of the missile.

The outer surface of section 14 is substantially tangential to the outer surface 22 of dome 18. The end face 20 of the dome 18 and the stepped, reduced rim portion 16 define a groove 24. The groove 24 is filled with an injected, flexible sealing material 26. The sealing material is a low-gas evolution, acid-free silicon caoutchouc.

A holding ring 28 engages the outer surface of section 14 of the structure 10 and extends over the groove 24 and the rim of the dome 18. The holding ring is not connected with the dome 18 by material bonding such as by soldering, cementing or the like. The holding ring is connected to section 14 of the structure 10 by spot welding at points 30.

The dome 18 is retained at its rim positively by formfit of its rim with the holding ring 28. Sealing is effected by the sealing material 26.

Instead of silicon caoutchouc, other highly ductile cements can be used as sealing material.

Figure 3:
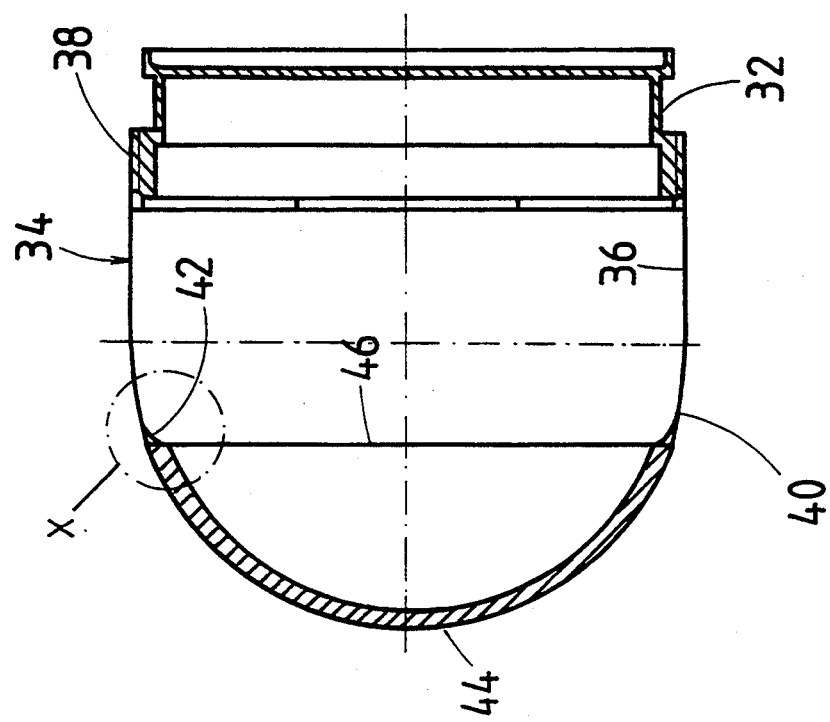
FIG. 3 is a longitudinal sectional view of the dome and of the adjacent structure of the missile in another embodiment of a connecting assembly.
Figure 4:
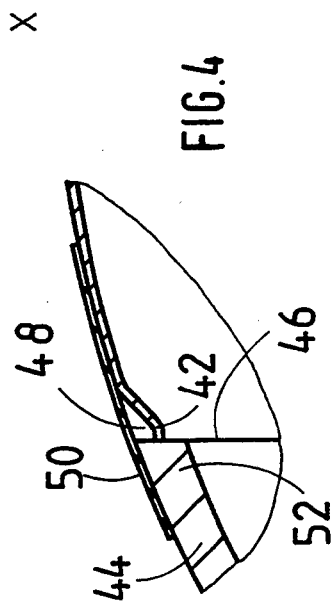
FIG. 4 shows a detail "X" of FIG. 3 at an enlarged scale.
Figure 5:
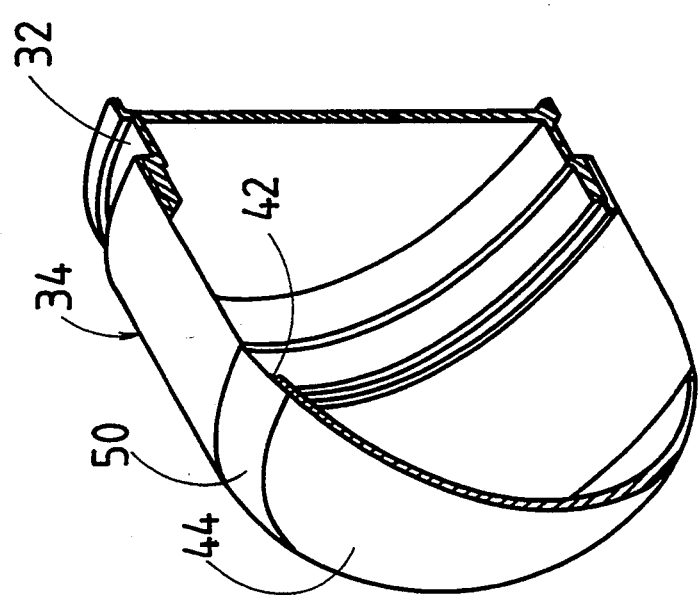
FIG. 5 is a sectional-perspective view of the dome and of the adjacent structure.

In the embodiment of FIG. 3 to 5, numeral 32 designates an annular, rigid structural element of the missile. A sheet metal shell 34 is attached to the structural element 32. The sheet metal shell 34 has a cylindrical rear section 36. The rear, structure-side rim of the rear section 36 is connected with the structural element 32. Towards the front, a substantially spherical section 40 communicates with the cylindrical section 36. Again a reduced rim portion 42 communicates with the spherical section 40. A spherical, cup-shaped dome 44 has a planar end face 46 engaging the reduced rim portion 42. The end face 46 and the reduced rim portion 42 define an annular recess or groove 48. This annular recess 48 is filled by a highly ductile cement serving as a seal. A holding ring 50 of sheet metal is connected with the sheet metal shell 34 in the spherical section 40 of the sheet metal shell 34. The holding ring 50 is also substantially spherical. The holding ring 50 extends over the annular recess 48 and over the rim 52 of the dome 44.

We claim:

1. A connecting assembly for connecting a dome covering a seeker head with the structure of a missile by means of a holding ring extending over the rim of said dome, positively holding said dome and connected with the structure of said missile, wherein an annular recess is provided underneath said holding ring along said rim of said dome, said recess containing a flexible sealing substance for establishing a seal between said holding ring and said dome, no additional material bonding being provided between said dome and said holding ring.

2. A connecting assembly as claimed in claim 1, wherein said sealing substance is of a nature to permit injection thereof into said annular recess.

3. A connecting assembly as claimed in claim 1, wherein said holding ring is connected with said structure by spot welding.

4. A connecting assembly as claimed in claim 1, wherein
   (a) said structure has a reduced rim portion,
   (b) said rim of said dome engaging an end face of said reduced rim portion, said annular recess being defined between said reduced rim portion of said structure and said rim of said dome.

5. A connecting assembly as claimed in claim 4, wherein
   (a) said structure of said missile has a sheet metal shell at its front end, said sheet metal shell having a cylindrical rear rim connected with a structure part and having a spherical section at its seeker-side front rim, and
   (b) said reduced rim portion communicating with said spherical section.

6. A connecting assembly as claimed in claim 4, wherein said structure, at its dome-end, has a slightly tapering section.

7. A connecting assembly as claimed in claim 6, wherein said slightly tapering section is slightly conical.

8. A connecting assembly as claimed in claim 6, wherein said slightly tapering section is spherical.

9. A connecting assembly as claimed in claim 6, wherein said dome has an end face engaging said end face of said reduced rim portion, said annular recess being defined by said rim portion and said end face of said dome.

10. A connecting assembly as claimed in claim 9, wherein
    (a) a shallow-stepped section communicates with said tapering section,
    (b) said reduced rim portion, in turn, communicating with said shallow-stepped section and has an outer surface reduced with respect to an outer surface of said shallow-stepped section, and
    (c) said holding ring engages said outer surface of said shallow-stepped section, is connected thereto and extends over said rim portion and said rim of said dome.

* * * * *